US012771291B2

(12) United States Patent
Xue et al.

(10) Patent No.: US 12,771,291 B2
(45) **Date of Patent: *Oct. 20, 2026**

(54) SUNLIGHT HARVESTING TRANSPARENT WINDOWS

(71) Applicant: University of Florida Research Foundation, Inc., Gainesville, FL (US)

(72) Inventors: Jiangeng Xue, Gainesville, FL (US); Wei David Wei, Gainesville, FL (US)

(73) Assignee: University of Florida Research Foundation, INC., Gainesville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/786,934

(22) Filed: Jul. 29, 2024

(65) Prior Publication Data

US 2024/0388247 A1 Nov. 21, 2024

Related U.S. Application Data

(63) Continuation of application No. 17/503,993, filed on Oct. 18, 2021, now Pat. No. 12,088,245, which is a (Continued)

(51) Int. Cl.
*H02S 40/22* (2014.01)
*B32B 3/08* (2006.01)
(Continued)

(52) U.S. Cl.
CPC ................ *H02S 40/22* (2014.12); *B32B 3/08* (2013.01); *B32B 7/04* (2013.01); *B32B 17/00* (2013.01);
(Continued)

(58) Field of Classification Search
CPC ......... H02S 40/22; H02S 20/26; H32B 27/40; H32B 27/20; E06B 3/64; E06B 3/6722;
(Continued)

(56) References Cited

U.S. PATENT DOCUMENTS 3,599,005 A 8/1971 Russell et al.
6,246,045 B1 6/2001 Morris et al.
(Continued)

FOREIGN PATENT DOCUMENTS

CN 102173133 A 9/2011
CN 202100151 1/2012
(Continued)

OTHER PUBLICATIONS

J. Xue, "Molecular Bulk Heterojunction Photovoltaic Cells", in Organic Electronics: Materials, Physics, Processing and Device Applications, edited by F. So, 359-391 (CRC Press, Boca Raton, FL, 2010).

(Continued)

*Primary Examiner* — Kourtney R S Carlson
(74) *Attorney, Agent, or Firm* — Thomas Horstemeyer LLP.

(57) ABSTRACT

A photovoltaic system is formed as a window that is constructed of at least one polymer layer that is filled or decorated with metal nanoparticles and a window frame that includes one or more photovoltaic cells. The metal nanoparticles have a shape and size such that they display surface plasmon resonance frequencies in the near-infrared and/or the near-ultraviolet. The near-infrared and/or the near-ultraviolet radiations are scattered such that they are transmitted parallel to the face of the window to the photovoltaic cells, where an electrical current is generated.

17 Claims, 4 Drawing Sheets

Related U.S. Application Data continuation of application No. 15/069,373, filed on Mar. 14, 2016, now Pat. No. 11,177,766.

(60) Provisional application No. 62/132,771, filed on Mar. 13, 2015.

(51) Int. Cl.

| | |
|---|---|
| ***B32B 7/04*** | (2019.01) |
| ***B32B 17/00*** | (2006.01) |
| ***B32B 27/06*** | (2006.01) |
| ***B32B 27/18*** | (2006.01) |
| ***B32B 27/20*** | (2006.01) |
| ***B32B 27/30*** | (2006.01) |
| ***B32B 27/36*** | (2006.01) |
| ***B32B 27/40*** | (2006.01) |
| ***H02S 20/26*** | (2014.01) |

(52) U.S. Cl.

CPC .............. *B32B 27/06* (2013.01); *B32B 27/18* (2013.01); *B32B 27/20* (2013.01); *B32B 27/308* (2013.01); *B32B 27/365* (2013.01); *B32B 27/40* (2013.01); *H02S 20/26* (2014.12); *B32B 2250/03* (2013.01); *B32B 2250/40* (2013.01); *B32B 2264/105* (2013.01); *B32B 2307/304* (2013.01); *B32B 2307/40* (2013.01); *B32B 2307/4026* (2013.01); *B32B 2307/412* (2013.01); *B32B 2307/558* (2013.01); *B32B 2307/706* (2013.01); *B32B 2307/732* (2013.01); *B32B 2457/12* (2013.01); *Y02B 10/10* (2013.01); *Y02E 10/52* (2013.01)

(58) Field of Classification Search

CPC .... E06B 3/6715; E06B 3/66–663; E06B 3/30; E06B 3/24

See application file for complete search history.

(56) References Cited

U.S. PATENT DOCUMENTS

| | | | | |
|---|---|---|---|---|
| 2005/0101160 | A1 | 5/2005 | Garg et al. | |
| 2006/0207388 | A1 | 9/2006 | Mirkin et al. | |
| 2008/0114082 | A1 | 5/2008 | Danzebrink | |
| 2009/0242526 | A1 | 10/2009 | Baldwin | |
| 2010/0175745 | A1 | 7/2010 | Kostecki et al. | |
| 2011/0109854 | A1 | 5/2011 | Tang et al. | |
| 2011/0116168 | A1 | 5/2011 | Nikoobakht | |
| 2011/0126889 | A1 | 6/2011 | Bourke, Jr. et al. | |
| 2011/0232211 | A1 | 9/2011 | Farahi | |
| 2011/0308611 | A1 | 12/2011 | Morgan | |
| 2012/0240979 | A1 | 9/2012 | Maeda et al. | |
| 2012/0273030 | A1 | 11/2012 | Jee | |
| 2013/0220413 | A1 | 8/2013 | Kozicki et al. | |
| 2013/0327928 | A1 | 12/2013 | Leach et al. | |
| 2013/0333742 | A1 | 12/2013 | Chang et al. | |
| 2013/0333755 | A1 | 12/2013 | Lunt et al. | |
| 2014/0034641 | A1 | 2/2014 | Akkapeddi | |
| 2014/0174534 | A1* | 6/2014 | Bickmore | H10F 71/00 438/69 |
| 2014/0352762 | A1 | 12/2014 | Carter et al. | |
| 2015/0036234 | A1 | 2/2015 | Ben-Yakar et al. | |
| 2015/0194555 | A1* | 7/2015 | Zhang | H10F 77/45 250/487.1 |

FOREIGN PATENT DOCUMENTS

| | | |
|---|---|---|
| CN | 203022587 | 6/2013 |
| EP | 2614177 | 7/2013 |
| KR | 2014053458 | 5/2014 |
| WO | 201212937 | 2/2012 |
| WO | 2015044525 A1 | 4/2015 |

OTHER PUBLICATIONS

J. Xue, "Perspectives on organic photovoltaics", Polym. Rev. 50, 411- 419 (2010).

Y. Zheng and J. Xue, "Organic Photovoltaic Cells Based on Molecular Donor-Acceptor Heterojunctions", Polym. Rev. 50, 420-453 (2010).

J. D. Myers and J. Xue, "Organic Semiconductors and their Applications in Photovoltaic Devices", Polym. Rev. 52, 1-37 (2012).

R. Zhou and J. Xue, "Hybrid Polymer-Nanocrystal Materials for Photovoltaic Applications", Chemphyschem 13, 2471-2480 (2012).

Y. Zheng, S. K. Pregler, J. D. Myers, J. Ouyang, S. B. Sinnott and J. Xue, "Computational and experimental studies of phase separation in pentacene:C-60 mixtures", Journal of Vacuum Science & Technology B 27, 169-179 (2009).

Y. Zheng, R. Bekele, J. Ouyang and J. Xue, "Organic photovoltaic cells with vertically aligned crystalline molecular nanorods", Org. Electron. 10, 1621-1625 (2009).

J. D. Myers, T.-K. Tseng and J. Xue, "Photocarrier behavior in organic heterojunction photovoltaic cells", Org. Electron. 10, 1182-1186 (2009).

Y. Zheng, R. Bekele, J. Ouyang and J. Xue, "Interdigitated bulk heterojunction organic photovoltaic cells with aligned copper phthalocyanine nanorods", IEEE J. Sel. Top. Quantum Electron. 16, 1544-1551 (2010).

W. T. Hammond and J. Xue, "Organic heterojunction photodiodes exhibiting low voltage, imaging-speed photocurrent gain", Appl. Phys. Lett. 97, 1-4 (2010).

J. Yang, A. Tang, R. Zhou and J. Xue, "Effects of nanocrystal size and device aging on performance of hybrid poly(3-hexylthiophene): CdSe nanocrystal solar cells", Sol. Energy Mater. Sol. Cells 95, 476-482 (2011).

W. Cao, J. D. Myers, Y. Zheng, W. T. Hammond, E. Wrzesniewski and J. Xue, "Enhancing light harvesting in organic solar cells with pyramidal rear reflectors", Appl. Phys. Lett. 99, 1-4 (2011).

L. Qian, J. Yang, R. Zhou, A. Tang, Y. Zheng, T.-K. Tseng, D. Bera, J. Xue and P. H. Holloway, "Hybrid polymer-CdSe solar cells with a ZnO nanoparticle buffer layer for improved efficiency and lifetime", J. Mater. Chem. 21, 3814-3817 (2011).

W. Zhao, J. P. Mudrick, Y. Zheng, W. T. Hammond, Y. Yang and J. Xue, "Enhancing photovoltaic response of organic solar cells using a crystalline molecular template", Org. Electron. 13, 129-135 (2012).

J. Yang, L. Qian, R. Zhou, Y. Zheng, A. Tang, P. H. Holloway and J. Xue, Hybrid polymer:colloidal nanoparticle 1-9 (2012).

O. M. Ntwaeaborwa, R. Zhou, L. Qian, S. S. Pitale, J. Xue, H. C. Swart and P. H. Holloway, "Post-fabrication annealing effects on the performance of P3HT:PCBM solar cells with/without ZnO nanoparticles", Physica B 407, 1631-1633 (2012).

J. D. Myers, W. Cao, V. Cassidy, S.-H. Eom, R. Zhou, L. Yang, W. You and J. Xue, "A universal optical approach to enhancing efficiency of organic-based photovoltaic devices", Energ Environ. Sci. 5, 6900-6904 (2012).

W. Cao, Y. Zheng, Z. Li, E. Wrzesniewski, W. T. Hammond and J. Xue, "Flexible organic solar cells using an oxide/ metal/oxide trilayer as transparent electrode", Org. Electron. 13, 2221-2228 (2012).

B. P. W. J. S. DuChene, A. C. Johnston-Peck, J. Qiu, M. Gomes, M. Amilhau, D. Bejleri, J. Weng, D. Su, F. Huo, E. A. Stach, and W. D. Wei, "Elucidating the Sole Contribution from Electromagnetic Near-Fields in Plasmon-Enhanced Cu2O Photocathodes", Advanced Energy Materials, 1-10 (2015).

Y. C. Wang, J. S. DuChene, F. Huo and W. D. Wei, "An in situ approach for facile fabrication of robust and scalable SERS substrates", Nanoscale 6, 7232-7236 (2014).

K. Qian, B. C. Sweeny, A. C. Johnston-Peck, W. Niu, J. 0. Graham, J. S. DuChene, J. Qiu, Y.-C. Wang, M. H. Engelhard, D. Su, E. A. Stach and W. D. Wei, "Surface Plasmon-Driven Water Reduction: Gold Nanoparticle Size Matters", Journal of the American Chemical Society 136, 9842-9845 (2014).

Basic Research Needs for Solar Energy Utilization. (U.S. Department of Energy Report of the Basic Energy Sciences Workshop on Solar Energy Utilization, http://science.energy.gov/•/mcdia/bcs/pdf/ rcpo1is/files/scu rpt.pd±: 2005).

(56) References Cited

OTHER PUBLICATIONS

W. Cao and J. Xue, "Recent progress in organic photovoltaics: device architecture and optical design", Energy Environ. Sci. 7, 2123-2144 (2014).
Optics and Photonics: Essential Technologies for Our Nation. (National Academies Press, 2013).
M. Pagliaro, R. Ciriminna and G. Palmisano, "BIPV: merging the photovoltaic with construction industry", Prog. Photovolt. 18, 61-72 (2010).
R. H. Ma and Y. C. Chen, "BIPV-Powered Smart Windows Utilizing Photovoltaic and Electrochromic Devices", Sensors-Basel 12, 359-372 (2012).
T. Schuetze, W. Willkomm and M. Roos, "Development of a Holistic Evaluation System for BIPV Facades", Energies 8, 6135-6152 (2015).
J. Cronemberger, M. A. Corpas, I. Ceron, E. Caamano-Martin and S. V. Sanchez, "BIPV technology application: Highlighting advances, tendencies and solutions through Solar Decathlon Europe houses", Energy Buildings 83, 44-56 (2014).
Y. T. Chae, J. Kim, H. Park and B. Shin, "Building energy performance evaluation of building integrated photovoltaic (BIPV) window with semi-transparent solar cells", Appl. Energy 129, 217-227 (2014).
S. R. Forrest, "The path to ubiquitous and low-cost organic electronic appliances on plastic", Nature 428, 911-918 (2004).
J. L. H. Chau, R. T. Chen, G. L. Hwang, P. Y. Tsai and C. C. Lin, "Transparent solar cell window module", Sol. Energy Mater. Sol. Cells 94, 588-591 (2010).
"http://www.energyglass.com/egl/", (Accessed Nov. 1, 2015), 1 page.
K. Thorkelsson, P. Bai and T. Xu, "Self-assembly and applications of anisotropic nanomaterials: A review", Nano Today 10, 48-66 (2015).
A. Klinkova, R. M. Choueiri and E. Kumacheva, "Self-assembled plasmonic nanostructures", Chem. Soc. Rev. 43, 3976-3991 (2014).
J. Qiu, Y.-C. Wu, Y.-C. Wang, M. H. Engelhard, L. McElwee-White and W. D. Wei, "Surface Plasmon Mediated Chemical Solution Deposition of Gold Nanoparticles on a Nanostructured Silver Surface at Room Temperature", Journal of the American Chemical Society 135, 38-41 (2013).
J. S. DuChene, B. C. Sweeny, A. C. Johnston-Peck, D. Su, E. A. Stach and W. D. Wei, "Prolonged Hot Electron Dynamics in Plasmonic-Metal/Semiconductor Heterostructures with Implications for Solar Photocatalysis", Angewandte Chemie International Edition 53, 7887-7891 (2014).
J. Qiu and W. D. Wei, "Surface Plasmon-Mediated Photothermal Chemistry", The Journal of Physical Chemistry C 118, 20735-20749 (2014).
C. L. Muhich, J. Qiu, A. M. Holder, Y .- C. Wu, A. W. Weimer, W. D. Wei, L. McElwee-White and C. B. Musgrave, "Solvent Control of Surface Plasmon-Mediated Chemical Deposition of Au Nanoparticles from Alkylgold Phosphine Complexes", ACS Applied Materials & Interfaces 7, 13384-13394 (2015).
J. E. Millstone, W. Wei, M. R. Jones, H. Yoo and C. A. Mirkin, "Iodide Ions Control Seed-Mediated Growth of Anisotropic Gold Nanoparticles", Nano Letters 8, 2526-2529 (2008).
W. Wei, S. Li, L. Qin, C. Xue, J. E. Millstone, X. Xu, G. C. Schatz and C. A. Mirkin, "Surface Plasmon-Mediated Energy Transfer in Heterogap Au—Ag Nanowires", Nano Letters 8, 3446-3449 (2008).
W. Wei, S. Li, J. E. Millstone, M. J. Banholzer, X. Chen, X. Xu, G. C. Schatz and C. A. Mirkin, "Surprisingly Long- Range Surface-Enhanced Raman Scattering (SERS) on AuNi Multisegmented Nanowires", Angewandte Chemie International Edition 48, 4210-4212 (2009).
C. Liusman, S. Li, X. Chen, W. Wei, H. Zhang, G. C. Schatz, F. Boey and C. A. Mirkin, "Free-Standing Bimetallic Nanorings and Nanoring Arrays Made by On-Wire Lithography", ACS Nano 4, 7676-7682 (2010).
J. S. DuChene, R. P. Almeida and W. D. Wei, "Facile synthesis of anisotropic Au@SiO2 core-shell nanostructures", Dalton Transactions 41, 7879-7882 (2012).
J. S. DuChene, W. Niu, J. M. Abendroth, Q. Sun, W. Zhao, F. Huo and W. D. Wei, "Halide Anions as Shape-Directing Agents for Obtaining High-Quality Anisotropic Gold Nanostructures", Chemistry of Materials 25, 1392-1399 (2013).
Y. M. Zhao, G. A. Meek, B. G. Levine and R. R. Lunt, "Near-Infrared Harvesting Transparent Luminescent Solar Concentrators", Adv. Opt. Mater. 2, 606-611 (2014).
J. H. Yoon, J. Song and S. J. Lee, "Practical application of building integrated photovoltaic (BIPV) system using transparent amorphous silicon thin-film PV module", Solar Energy 85, 723-733 (2011).
J. S. Huang, G. Li and Y. Yang, "A semi-transparent plastic solar cell fabricated by a lamination process", Adv. Mater. 20, 415-419 (2008).
W. J. da Silva, H. P. Kim, A. R. B. Yusoff and J. Jang, "Transparent flexible organic solar cells with 6.87% efficiency manufactured by an all-solution process", Nanoscale 5, 9324-9329 (2013).
K. S. Chen, J. F. Salinas, H. L. Yip, L. J. Huo, J. H. Hou and A. K. Y. Jen, "Semitransparent polymer solar cells with 6% PCE, 25% average visible transmittance and a color rendering index close to 100 for power generating window applications", Energy Environ. Sci. 5, 9551-9557 (2012).
C. C. Chueh, S. C. Chen, H. L. Yip, J. F. Salinas, C. Z. Li, K. S. Chen, F. C. Chen, W. C. Chen and A. K. Y. Jen, "Toward High-Performance Semi-Transparent Polymer Solar Cells: Optimization of Ultra-Thin Light Absorbing Layer and Transparent Cathode Architecture", Adv. Energy Mater. 3, 417-423 (2013).
C. C. Chen, L. T. Dou, R. Zhu, C. H. Chung, T. B. Song, Y. B. Zheng, S. Hawks, G. Li, P. S. Weiss and Y. Yang, "Visibly Transparent Polymer Solar Cells Produced by Solution Processing", ACS Nano 6, 7185-7190 (2012).
C. H. Cheng, Y. H. Lin, J. H. Chang, C. I. Wu and G. R. Lin, "Semi-transparent Si-rich SixCl-x p-i-n photovoltaic solar cell grown by hydrogen-free PECVD", RSC Adv. 4, 18397-18405 (2014).
D. M. Chen, Z. C. Liang, L. Zhuang, Y. F. Lin and H. Shen, "A novel method to achieve selective emitter for silicon solar cell using low cost pattern-able a-Si thin films as the semi-transparent phosphorus diffusion barrier", Appl. Energy 92, 315-321 (2012).
A. Kerrouche, D. A. Hardy, D. Ross and B. S. Richards, "Luminescent solar concentrators: From experimental validation of 3D ray-tracing simulations to coloured stained-glass windows for BIPV", Sol. Energy Mater. Sol. Cells 122, 99-106 (2014).
M. G. Debije and P. P. C. Verbunt, "Thirty Years of Luminescent Solar Concentrator Research: Solar Energy for the Built Environment", Adv. Energy Mater. 2, 12-35 (2012).
W. H. Weber and J. Lambe, "Luminescent Greenhouse Collector for Solar-Radiation", Appl. Opt. 15, 2299-2300 (1976).
A. Goetzberger and W. Greubel, "Solar-Energy Conversion with Fluorescent Collectors", Appl. Phys. 14, 123-139 (1977).
J. A. Levitt and W. H. Weber, "Materials for Luminescent Greenhouse Solar Collectors", Appl. Opt. 16, 2684-2689 (1977).
H. Hernandez-Noyola, D. H. Potterveld, R. J. Holt and S. B. Darling, "Optimizing luminescent solar concentrator design", Energ Environ. Sci. 5, 5798-5802 (2012).
N. Aste, L. C. Tagliabue, C. Del Pero, D. Testa and R. Fusco, "Performance analysis of a large-area luminescent solar concentrator module", Renew. Energy 76, 330-337 (2015).
R. Jin, Y. Cao, C. A. Mirkin, K. L. Kelly, G. C. Schatz and J. G. Zheng, "Photoinduced Conversion of Silver Nanospheres to Nanoprisms", Science 294, 1901-1903 (2001).
K. L. Kelly, E. Coronado, L. L. Zhao and G. C. Schatz, "The Optical Properties of Metal Nanoparticles: The Influence of Size, Shape, and Dielectric Environment", The Journal of Physical Chemistry B 107, 668-677 (2003).
S. E. Skrabalak, L. Au, X. Li and Y. Xia, "Facile synthesis of Ag nanocubes and Au nanocages", Nature Protocols 2, 2182-2190 (2007).

(56) References Cited

OTHER PUBLICATIONS

M. Rycenga, C. M. Cobley, J. Zeng, W. Li, C.H. Moran, Q. Zhang, D. Qin and Y. Xia, "Controlling the Synthesis and Assembly of Silver Nanostructures for Plasmonic Applications", Chemical Reviews 111, 3669-3712 (2011).

M. B. Cortie and A. M. McDonagh, "Synthesis and Optical Properties of Hybrid and Alloy Plasmonic Nanoparticles", Chemical Reviews 111, 3713-3735 (2011).

H. Yoo, J. E. Millstone, S. Li, J.-W. Jang, W. Wei, J. Wu, G. C. Schatz and C. A. Mirkin, "Core-Shell Triangular Bifrustums", Nano Letters 9, 3038-3041 (2009).

M. D. Brown, T. Suteewong, R. S. S. Kumar, V. D'Innocenzo, A. Petrozza, M. M. Lee, U. Wiesner and H. J. Snaith, "Plasmonic Dye-Sensitized Solar Cells Using Core-Shell Metal-Insulator Nanoparticles", Nano Letters 11, 438-445 (2011).

S. Peppernick, A. Joly, K. Beck, W. Hess, J. Wang, Y.-C. Wang and W. D. Wei, "Photoemission electron microscopy of a plasmonic silver nanoparticle trimer", Appl. Phys. A 112, 35-39 (2013).

Wei, W., Wei Zhao and J. M. White, "Directly Probing the Hybrid Bonding of Styrene on Cu(I 11)", Journal of the American Chemical Society 126, 16340-16341 (2004).

W. Wei, S. L. Parker, Y.-M. Sun, J. M. White, G. Xiong, A.G. Joly, K. M. Beck and W. P. Hess, "Study of copper diffusion through a ruthenium thin film by photoemission electron microscopy", Applied Physics Letters 90, 1-4 (2007).

C. Awada, G. Barbillon, F. Charra, L. Douillard and J. J. Greffet, "Experimental study of hot spots in gold/glass nanocomposite films by photoemission electron microscopy", Physical Review B 85, 1-6 (2012).

R. Konenkamp, R. C. Word, J. P. S. Fitzgerald, A. Nadarajah and S. D. Saliba, "Controlled spatial switching and routing of surface plasmons in designed singlecrystalline gold nanostructures", Applied Physics Letters 101, 1-4 (2012).

R. C. Word, J.P. S. Fitzgerald and R. Konenkamp, "Electron emission in the near-field of surface plasmons", Surface Science 607, 148-152 (2013).

W. Cao, Z. Li, Y. Yang, Y. Zheng, W. Yu, R. Afzal and J. Xue, "Solar tree": Exploring new form factors of organic solar cells, Renewable Energy 72, 134-139 (2014).

"Window" The American Heritage Dictionary of the English Language, edited by Editors of the American Heritage Dictionaries, Houghton Mifflin, 6th edition, 2016, Credo Reference, https://search.credoreference.com/content/entry/ hmdictenglang/window/0?institutionld=743 (Year: 2016).

Lu, et al., Experimental demonstration of plasmon enhanced energy transfer rate in NaYF4:Yb3+, Er3+ upconversion nanoparticles, Scientific Reports, 2016, 6: 18894, pp. 1-11.

Corbierre, et al., Gold Nanoparticle/Polymer Nanocomposites: Dispersion of Nanoparticles as a Function of Capping Agent Molecular Weight and Grafting Density, Lanamuir, 2005, pp. 6063-6072, vol. 21.

Folarin et al., Polymer-noble metal nanocomposites: Review, International Journal of the Physical Sciences, Sep. 30, 2011, pp. 4869-4882, vol. 6, No. 21.

Khosla, Nanoparticle-doped Electrically-conducting Polymers for Flexible Nano-Micro Systems, The Electrochemical Society Interface, 2012, pp. 67-70.

Kwon, et al., Preparation of Silver Nanoparticles in Cellulose Acetate Polymer and the Reaction Chemistry of Silver Complexes in the Polymer, Bull. Korean Chem. Soc., 2005, pp. 837-840, vol. 26, No. 5.

Lunt, et al., Transparent, near-infrared organic photovoltaic solar cells for window and energy-scavenging applications, Applied Physics Letters, 2011, pp. 113305 (1-3), vol. 98.

Noguez, Surface Plasmons on Metal Nanoparticles: The Influence of Shape and Physical Environment, J. Phys. Chem. C, 2007, pp. 3806-3819, vol. 111.

Shim et al., Preparation of Iron Nanoparticles in Cellulose Acetate Polymer and Their Reaction Chemistry in the Polymer, Bull. Korean Chem. Soc., 2001, pp. 772-774, vol. 22, No. 7.

Tyurin et al., Particle size tuning in silver-polyacrylonitrile nanocomposites, eXPRESS Polymer Letters, 2010, pp. 71-78, vol. 4, No. 2.

Solar Windows Technologies, Inc. product information, [on line, webpage, retrieved Mar. 24, 2016] from http://solarwindow.com/technologyl, pp. 1-6.

Shim et al., Preparation of Copper Nanoparticles in Cellulose Acetate Polymer and the Reaction Chemistry of Copper Complexes in the Polymer, Bull. Korean Chem. Soc., 2002, pp. 563-566, vol. 23, No. 4.

* cited by examiner

SUNLIGHT HARVESTING TRANSPARENT WINDOWS

CROSS-REFERENCE TO RELATED APPLICATIONS

This application is a continuation application claiming priority to U.S. patent application Ser. No. 17/503,993, filed Oct. 18, 2021, having the title "SUNLIGHT HARVESTING TRANSPARENT WINDOWS", which claims priority to, and the benefit of, co-pending U.S. patent application Ser. No. 15/069,373, filed Mar. 14, 2016, which claims priority to, and the benefit of, U.S. Provisional Application Ser. No. 62/132,771, filed Mar. 13, 2015, both of which are hereby incorporated by reference herein in their entireties, including all figures, tables and drawings.

BACKGROUND OF INVENTION

A solar panel that allows light to pass through a pane of glass has been a target of scientist for more than a decade as it would permit using ordinary domestic windows to generate electricity with minimum structural alterations. Such solar cells can be used to harvest sunlight and the artificial light after sundown. One direction that is pursued is to have ultra-thin nearly transparent organic solar cells sprayed as films on a pane of glass. These windows are promoted as privacy glass.

Instead of having the entire surface as a light collecting solar cell, some windows are designed to direct the light that hits the entire surface of the window to the edges of a pane of glass where it is collected by a solar cell. One approach that has been pursued is by forming a solar concentrating organic coating on a pane of glass that absorbs non-visible electromagnetic radiation in sunlight, either ultraviolet or near-infrared, and re-emit the light at a higher wavelength, infrared, where it is transported across the pane of the window to a solar cell at the frame of the window. Alternatively, inorganic nanoparticles, quantum dots, have been co-infused in a polymethylmethacrylate (acrylic) window, where UV, violet and blue light is absorbed and undergoes a Stokes shift and emits red light that travels with nearly total internal reflectance to the edge of the window.

In another approach inorganic nanoparticle salts have been co-infused in a polycarbonate interlayer, which is then laminated between two plates of ¼" inch glass to form a window. The nanoparticles scatter components of the electromagnetic spectrum to the edge of the glass while letting most of the spectrum through. Again, the light that reaches the edge of the glass is collected at the window frame by a solar cell imbedded therein. The transparent inorganic nanoparticles scatter incoming sunlight with most scattered light traveling laterally in the laminated structure to commercial solar cells, such as crystalline silicon cells, at the edges of the glass windows. The window remains highly transparent by proper control of the nanoparticle size and loading in the polymer. Generally, the electrical power generated by such solar windows is quite low, ~1 W per square foot. These transparent nanoparticles scatter shorter wavelength light effectively, but do not scatter infrared light. Hence, it would be desirable to increase the harvesting of infrared light without sacrificing the transparency of the windows to the visible spectrum.

SUMMARY OF THE INVENTION

An embodiment of the invention is directed to a photovoltaic system that is a window that includes at least one combined nanoparticle polymer sheet and a frame that includes at least one photovoltaic cell to receive at least IR light directed through the window to the photovoltaic cell for the generation of electricity. The at least one combined nanoparticle polymer sheet has a transparent polymer that has at least partial transmittance in at least the visible and near IR regions of the electromagnetic spectrum. The metal nanoparticles can be imbedded within the combined nanoparticle polymer sheet or are decorated on at least one surface of the combined nanoparticle polymer sheet on surfaces parallel to the large area faces of the window. The metal nanoparticles are of sizes and shapes that have surface plasmon resonance frequencies in the near-infrared or the near-ultraviolet. The multiplicity of metal nanoparticles can have a plurality of sizes and shapes and can have a cross-section of 10 to 200 nm. The metal nanoparticles can have a core-shell structure, wherein the core is the metal and the shell is a glass or ceramic. The transparent polymer can be of one or more polymeric resins or thermoplastics, such as an acrylic, a polycarbonate, or a polyurethane. The window comprises a plurality of combined nanoparticle polymer sheets having a multiplicity of surfaces, where the surfaces are proximal and distal light receiving faces of the plurality of combined nanoparticle polymer sheets and interfaces between adjacent combined nanoparticle polymer sheets. The photovoltaic cell can be constructed with polycrystalline silicon, monocrystalline silicon, or copper indium gallium selenide. The photovoltaic system's window can have one or more glass sheets contacting combined nanoparticle polymer sheets.

Another embodiment of the invention is directed to preparing the photovoltaic system. The transparent polymer is combined with the multiplicity of nanoparticles to form at least one combined nanoparticle polymer sheet in the form of a window. The window is secured into the frame such that at least one edge of the window that is perpendicular to a light receiving face of the window contacts at least one photovoltaic cell situated in the frame such that light directed from the window perpendicular to the light receiving phase enters the photovoltaic cell. The transparent polymer can be provided as at least one solid cured resin or as a solid thermoplastic as a polymer sheet that is combined with the multiplicity of nanoparticles by decorating one or more surfaces of the polymer sheets. Alternatively, the transparent polymer can be provided as a thermoplastic melt, a polymerizable monomer mixture, or an uncured resin and combined with the multiplicity of nanoparticles by their mixing in a fluid state and solidifying the combined nanoparticle polymer sheet by cooling a melt, polymerizing a monomer, or curing a resin to lock the nanoparticles within the sheet. One or more glass sheets can be combined with the at least one combined nanoparticle polymer sheet such that glass sheets can protect the plastic and/or act as portions of a wave guide to direct the light into the photovoltaic cells.

DETAILED DISCLOSURE

Figure 1:
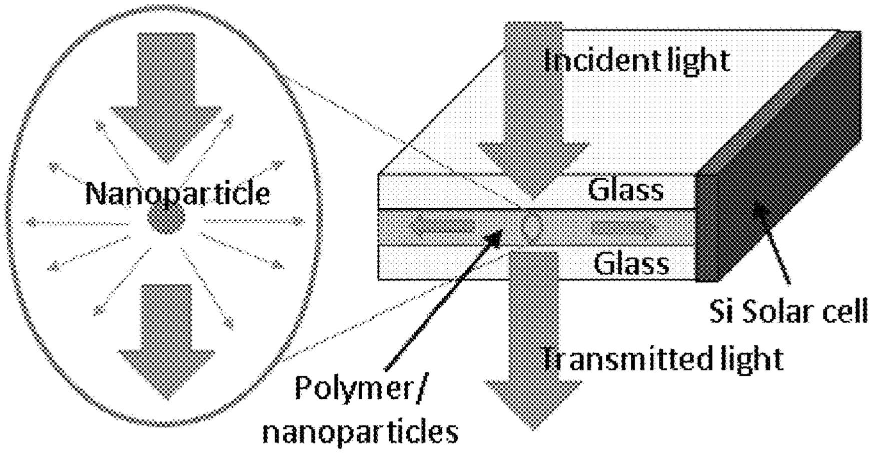
FIG. 1 is a drawing of a portion of a sunlight harvesting window according to an embodiment of the invention.

According to an embodiment of the invention, metal nanocrystals are imbedded into a transparent polymer, such as an acrylic, or decorate the surface of one or more layers of a transparent polymer, such as a polycarbonate, acrylic, or polyurethane, to selectively scatter certain portions of the solar spectrum from near-ultraviolet to visible to near-infrared, to a solar cell imbedded in the frame of a window, as illustrated in FIG. 1. The polymer may be in the form of a thermoplastic, or in the form of a cured resin. In an embodiment of the invention, the metal nanoparticles primarily scatter near-infrared and/or near-ultraviolet radiation, although the scattering of a small portion of the visible light can accompany the scattering of the near-infrared or near-ultraviolet radiation. The metal nanocrystals can be a mixture of nanocrystals of different elements or alloys and/or of different sizes and/or shapes. Due to the mixed composition, a broad portion of the near ultraviolet and/or near-infrared spectrum that enters the polymer can be directed to the edge and collected at a solar cell situated at the edge of the window at or within the window frame. In this manner, little visible light that would be transmitted through the window absent the metal nanoparticles would be lost due to the presence of the scattering metal nanoparticles. Harvesting of the near-ultraviolet and/or near-infrared light by the solar cells attached to the frame perpendicular to the face of the window can increase the electrical power output of the solar cells as the surface area from which non-visible radiation is scattered is dramatically larger than the surface of the solar cell, concentrating the radiant energy at the solar cell.

In another embodiment of the invention, the metal nanoparticles may selectively scatter portions of the visible spectrum in addition to near-ultraviolet and/or near-infrared light. The use of such nanoparticles, either by themselves or mixed together with other nanoparticles that primarily scatter near-ultraviolet and/or near-infrared light, in the same solar window structures can produce tinted windows with various colors. Furthermore, an appropriate combination of multiple types of nanoparticles that produce different color tints can yield color-neutral windows whose visible light transmittance can be adjusted by controlling the loading of the nanoparticles in the window structure.

Figure 2:
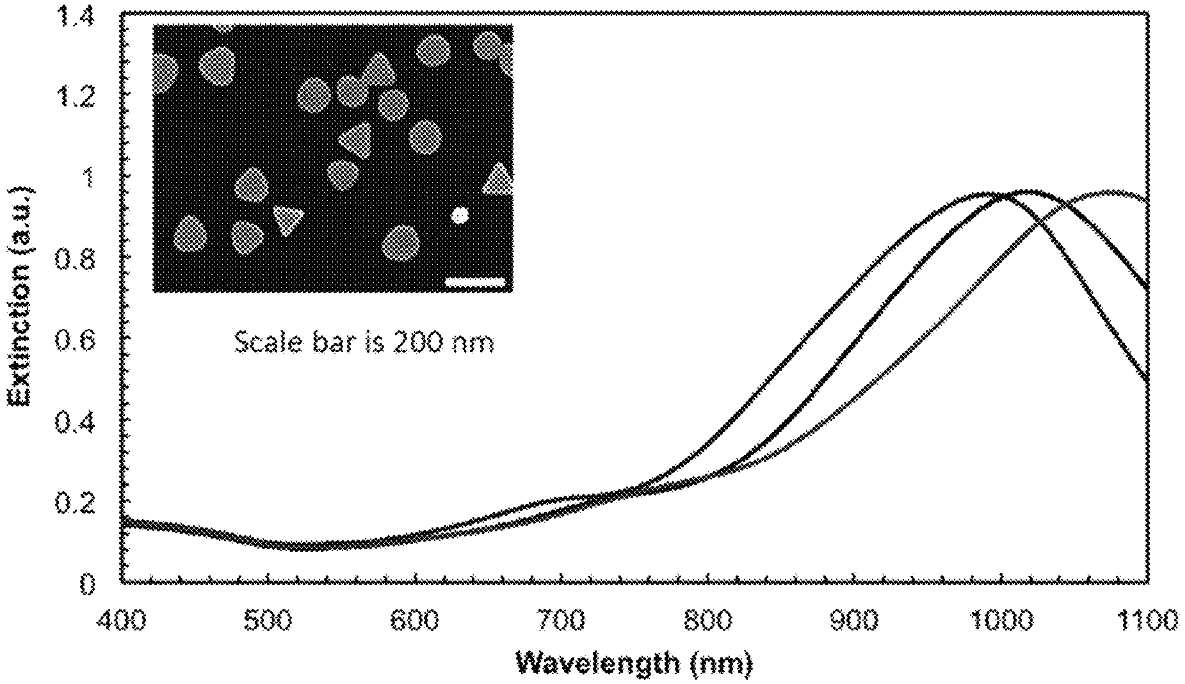
FIG. 2 is three light extinction spectra of gold nanoparticles with different sizes. The inset shows a SEM image of a plurality of gold nanoparticles of different shapes that can be dispersed on or within plastics for the construction of windows, according to embodiments of the invention.

The metal nanoparticles scatter the light at the surface plasmon resonance frequency where excitation of their surface plasmon oscillation occurs. The scattering light intensity is sensitive to the size and aggregation state of the metal nanoparticles in addition to the composition of the metal or alloy. The metals that can be used are solids, including, but not limited to, noble metals and alloys of noble metals, such as: ruthenium, rhodium, palladium, silver, osmium, iridium, platinum, gold, rhenium, and copper. The metal nanoparticles can be formed in any manner that provides nanoparticles that are greater than about 10 nm but less than about 200 nm. The nanoparticles are of sizes and shapes that display plasmon resonance frequencies in the near infrared region or ultraviolet region of the electromagnetic spectrum. As the particles are smaller than the wavelengths of visible light and the scattered wavelengths are not of the wavelengths of visible light, the windows formed with these nanoparticles display a high light transparence and low scattering of visible light. The nanoparticles can be any shape, for example, as shown in FIG. 2. The nanoparticles can be rods or other shapes that do not have equal dimensions but where one of the cross-sections is less than 200 nm. In an embodiment of the invention, the nanoparticles are of a plurality of sizes and shapes to provide a broad spectrum of near infrared and/or ultraviolet radiation for absorption by the photovoltaic cells situated in the frame of the windows.

Figure 3:
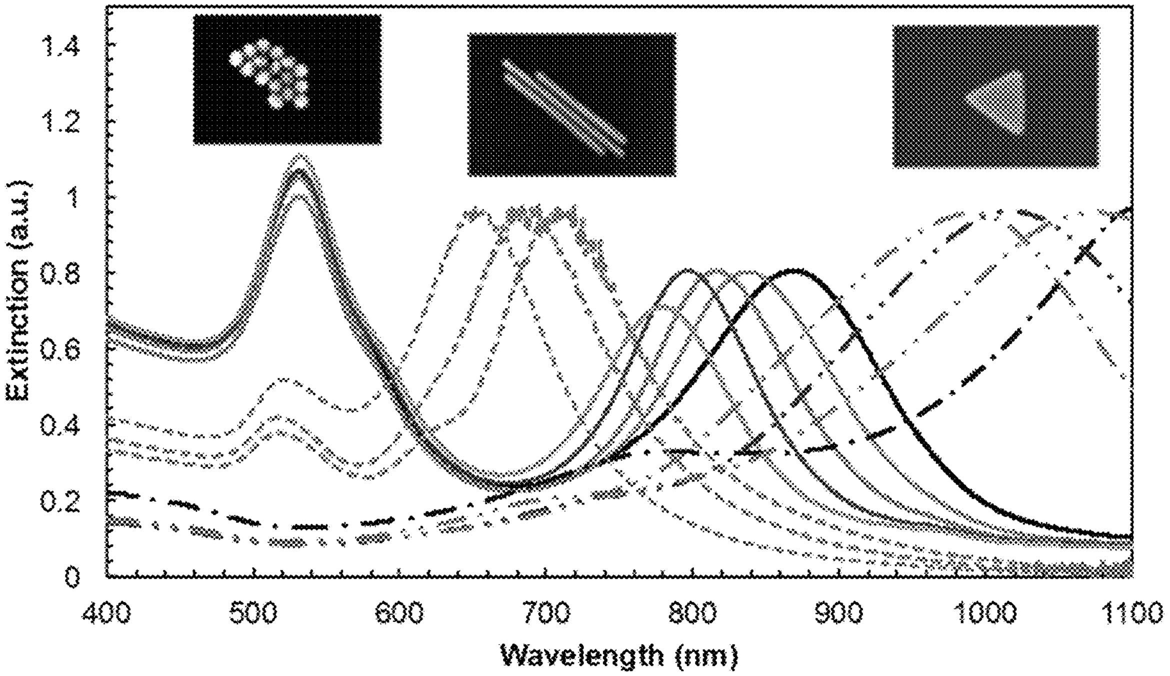
FIG. 3 is the light extinction spectra of a set of gold nanoparticles with a plurality of different shapes nanospheres, nanorods, and nanoprisms, as indicated by the SEM image insets, and sizes that can be dispersed on or within plastics for the construction of windows, according to embodiments of the invention.

The plasmon resonant frequency may appear in the visible spectrum by a change in the nanoparticle shape. As shown in FIG. 3, while the gold nanoprisms show primary plasmon resonant frequencies in the infrared region, the nanorods have primary plasmon resonant frequencies at wavelength range of about 640 nm to 720 nm. Moreover, the nanospheres show resonant peaks in both the visible (about 530 nm) and infrared (about 800 to 900 nm) regions. Each type of these nanoparticles can be used to produce a specific tint because of their different spectral response. An appropriate combination of multiple types of nanoparticles can then produce color-neutral windows that have mostly constant transmittance throughout the visible spectrum. Certainly, all these visible-scattering nanoparticles can be combined with others that primarily scatter near-infrared and/or near-ultraviolet light to enhance the overall light harvesting efficiency.

In an embodiment of the invention, the metal nanoparticles are dispersed as filler in a plastic or resin continuous matrix that is a layer that defines the surface area of the window. In another embodiment of the invention, the nanoparticles are dispersed on at least one face of at least one plastic or resin layer within the window. The window may be of a laminate structure where a plurality of layers includes at least one plastic or resin layer. The plastics are advantageous in that they provide transparency, structure, impact resistance, and thermal insulation. The windows can be thicker than a typical single-strength glass of 3/32", or double-strength glass of 1/8", or even plate glass of 3/16". The plastic can be the laminate between multiple layers of glass, for example, the multiple layers of a glass bullet-resistant pane. The plastic can be a layer of more than one inch in thickness. The polymer is one that does not absorb significantly in the near-infrared, below about 1200 nm in wavelength, such as an acrylic resin or a polycarbonate sheet.

The metal nanoparticles are dispersed in the plastic or resin matrix such that there are few aggregates of the metal nanoparticles in or on the polymer layer; for example, the fraction of metal nanoparticles in contact with another metal nanoparticle is 0.1 or less. The metal nanoparticles can be dispersed in a melt or solution, or dispersed in a monomer mixture that includes an initiator upon solidification of the mixture. For example, an acrylate resin, which is primarily methylmethacrylate with other monomers, including cross-linking monomers, initiators, and fillers, can be use in a neat liquid phase where the metal nanoparticles are dispersed into the monomer mixture with high-sheer mixing and where the monomer mixture polymerized to the solid window sheet with little agglomeration of the metal nanoparticles before the mixture is sufficiently viscous to discourage diffusion and agglomeration within the composite. In like fashion a polycarbonate can be taken up in a solvent and the particles dispersed followed by removal of the solvent, or, alternatively, by the polymerization of melted cyclic carbonate oligomers with dispersed metal nanoparticles to prepare the polymer layer of the window.

The use of glass sheets, or other low oxygen diffusion sheets, on the faces of the window, as shown in FIG. 1, permit functioning as a wave guide where internal reflection directs the scattered near-infrared light through the window perpendicular to the light entry surface to a solar cell within the frame of the window. The window frame contains one or more solar cells that can collect the scattered near-infrared light from the metal nanoparticles. The solar cells can be any type of solar cell that absorbs sufficiently in the near-infrared, including, but not limited to: polycrystalline silicon, monocrystalline silicon, or copper indium gallium selenide. In addition to $Cu(InGa)Se_2$ (CIGS), other direct bandgap materials with low gaps can be used for the solar cells in the window frames. Other photovoltaic cells, including polymeric and dye sensitized cells, can be designed to extend the absorption of radiant energy further into the ultraviolet and/or infrared regions of the electromagnetic spectrum and can be employed in the window based photovoltaic system. The exterior faces of the window can be a polymer of like or dissimilar composition as the polymer with the decorated or infused metal nanoparticles. The frame can be constructed of a plurality of solar cells combined as an array.

In embodiments of the invention, windows with high visible light transmission (VLT) contain only IR-scattering nanoparticles. In other embodiments of the invention, photovoltaic windows having blue, green, or brown hues are formed by inclusion of visible and IR scattering nanoparticles into the films on the windows. These windows can include pigments and other components that additionally or exclusively provide the colors of the tinted windows. In another embodiment of the invention, multiple types of visible-scattering nanoparticles can be combined to achieve low VLT/non-tinted photovoltaic windows or low VLT tinted windows with the additional inclusion of pigments.

Efficient scattering of visible and NIR light is required to achieve solar windows where the VLT ranges from low to high. The light-harvesting nanoparticles included in the window must be capable of scattering across a broad range of the solar spectrum. The surface plasmon resonance (SPR) of plasmonic metal NPs can be tuned to maximize the scattering of incident light over a broad range by manipulating their sizes and shapes. Selective use of nanorods or nanoprisms allows alteration of the SPR modes of the nanoparticles across the entire visible and NIR regions of the solar spectrum, as shown in FIG. 3. Plasmonic nanospheres (~400-550 nm), nanorods (~500-900 nm), and nanoprisms (~800-1400 nm) can be used to promote scattering across the broad range of 400 to 1400 nm. It is also noted that those solution-based methods employed herein can be easily extended for large-scale nanomaterials synthesis.

In embodiments of the invention, Au nanoparticle of differing morphologies can be used, according to embodiments of the invention. Small Au seed nanoparticles ($d \approx 4$-6 nm) can be prepared by $NaBH_4$ reduction of $HAuCl_4$, and can be used for subsequent growth in aqueous solution. Such aqueous solutions contain capping agents, including, but not limited to, cetyltrimethylammonium bromide (CTABr)), and $HAuCl_4 \cdot 3H_2O$, and reducing agents, such as, but not limited to, ascorbic acid, with base solution employed to adjust pH. By varying solution temperature, pH, and $HAuCl_4$ concentration, various Au nanoparticles can be produced.

In other embodiments of the invention, the optical properties of the colloids can be tuned by the use of plasmonic alloys, such as, but not limited to, Au/Ag alloy or by use of core-shell nanoparticles, such as, but not limited to, Au—Ag core-shell nanoparticles. Such particles can be formed by the simultaneous or sequential reduction of, for example, $HAuCl_4$ and $AgNO_3$ salts. The LSPR of Au nanoprisms occurs around 1200 nm, but formation of a glass shells on a Au nanoprism induces a significant blue-shift in the LSPR maximum to about 1000 nm.

Figure 4:
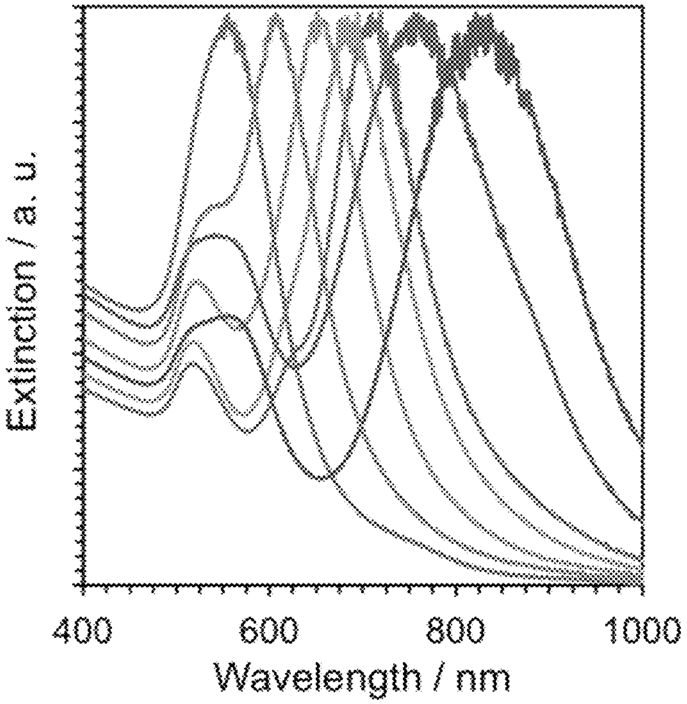
FIG. 4 is the light extinction spectra of a set of gold nanorods of different aspect ratio.

In an embodiment of the invention, Au nanorods can be used as "seeds" for the subsequent growth of anisotropic Au nanorods and/or nanowires. The length of the Au nanorods can be tuned by changing the concentration of the capping reagent, such as CTABr, and the ratio of the Au seeds to the $HAuCl_4$ precursors in the growth solution. The plasmon bands of the Au nanorods can be chosen from ~550-900 nm and can be combined to extend the absorption across any portion of the visible and near-IR spectrum, as shown in FIG. 4. Interestingly, our initial results revealed that the Au nanoparticle morphology can be easily tuned by simply varying the iodide ($I^-$) concentration in the growth solution. Bu controlling the amount of iodide in the solution, a large population of nanorods can be obtained when no $I^-$ is in solution or a large population of nanoprisms at concentration of $I^-$ greater than 10 μM, with the shapes and scattering shown in FIG. 2. By further adjusting the $I^-$ concentration, tip truncation of the nanoprisms can be controlled to alter the LSPR properties. For instance, the LSPR of the nanoprisms can be tuned from 1000-1200 nm by changing the $I^-$ concentration from 50-500 μM NaI in the growth solution. The nanorod or nanoprism aspect ratio can be tuned by adjusting the ratio of seed particles to metal precursors in the growth solution.

Light-mediated synthesis of metal nanocrystals allows synthesis of nanostructures with precise control over morphology. In this manner, Ag nanoprisms have been prepared that have strong absorption in the NIR region, where the architecture of the nanoprisms correlates in a quasi-linear fashion with the in-plane dipole plasmon band. When the light has a wavelength that matches the SPR bands of the plasmonic seed nanoparticles in the solution, nanoparticle growth is initiated. The SPR bands of the growing nanoparticles red-shifts as their sizes and shapes change. Once the SPR bands shift from that of the light source, nanoparticle growth stops. By adjustment of the illumination to match the new SPR bands, growth of the nanoparticle can be continued in a controlled manner. By this method, Au nanoprisms with strong SPR absorption in the NIR region can be prepared. Using sharp band-pass filters for narrow wavelength distribution or by use of lasers as the light source, Ag nanoparticles with uniform size and shape can be acquired in high yield.

Figure 5A:
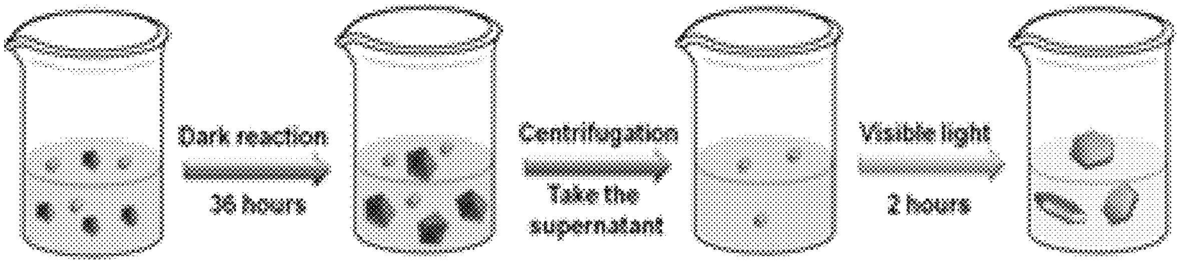
FIG. 5A is a cartoon of the plasmon-driven growth of Au nanoprism.
Figure 5B:
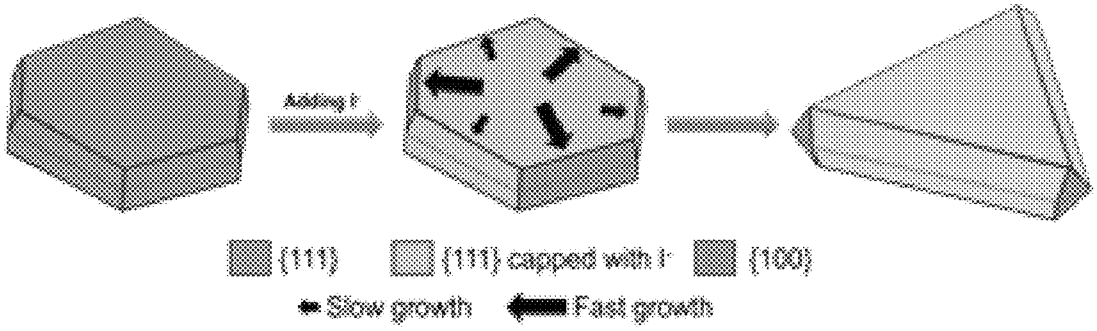
FIG. 5B illustrates the selective inhibition of facet and subsequent facet selective growth of Au nanoprism.

Pseudo-spherical Au nanoparticles with an average size of ca. 7±3 nm are useful as seeds for plasmon-driven growth of anisotropic Au nanoprisms. Photochemical growth solution can be prepared by adding polyvinylpyrrolidone (PVP) to pure $H_2O$ and methanol to which $HAuCl_4$ aqueous solution and Au seed solution are added and gently mixed. As illustrated in FIG. 5A, for high yield synthesis of Au nanoprism, growth solution is first incubated in the dark to preferentially enlarge multiply-twinned seeds while rendering planar-twinned seeds relatively unreactive in the dark. The multiply-twinned nanoparticles are large enough ($d > 100$ nm) to be readily separated from the planar-twinned seeds (d~15 nm) by centrifugation. The supernatant of highly enriched with planar-twinned nanocrystals is irradiated at an incident power $I_0$ of about 12 $mW/cm^2$ to produce Au nanoprisms in high yield. The facets along the nanoprism perimeter is alternatively enclosed by {111} and {100} facets. If a facet-selective species such as iodide is in the growth solution, preferential passivation of {111} facets occurs with growth occurring on the {100} facets to yield triangular nanoprisms as the dominant photoproducts, as indicated in FIG. 5B.

Figure 6A:
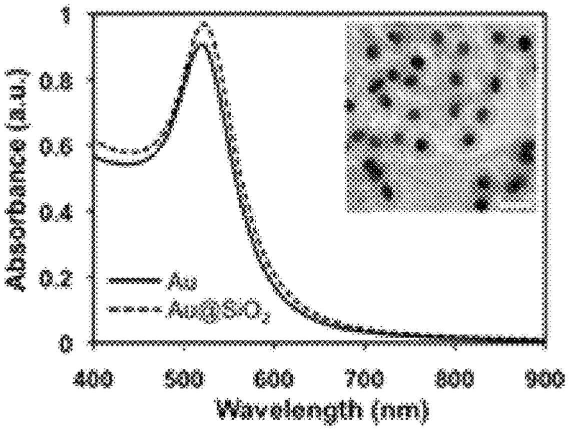
FIG. 6A shows the Vis-NIR spectra and TEM images of Au and silica encapsulated nanospheres.
Figure 6B:
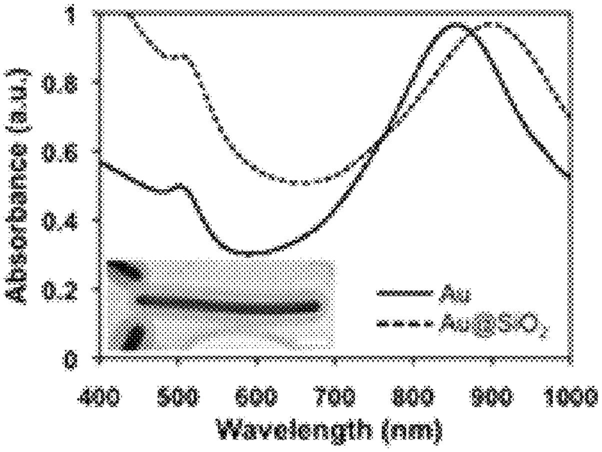
FIG. 6B shows the Vis-NIR spectra and TEM images of Au and silica encapsulated nanorods.
Figure 6C:
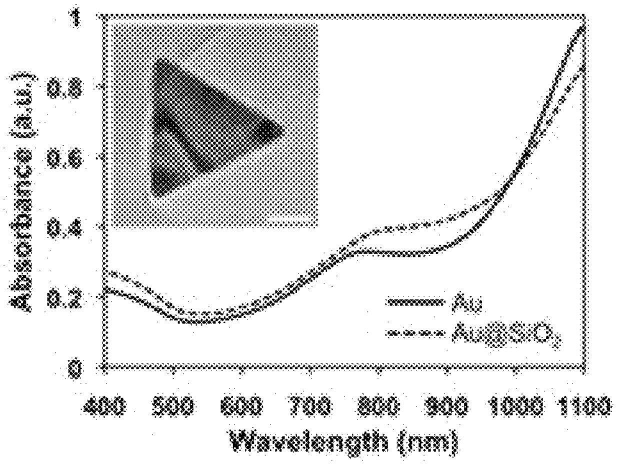
FIG. 6C shows the Vis-NIR spectra and TEM images of Au and silica encapsulated triangular nanoprisms.

The optical properties of plasmonic nanoparticles are highly sensitive to their physical morphology and, therefore, it is essential to preserve the geometry of the nanoparticles to ensure consistent operation over time. In an embodiment of the invention, glass or ceramic shells, for example, silica ($SiO_2$) shells, coat plasmonic metal nanoparticles (Au, Ag, etc.). These core-shell nanoparticles are used to provide plasmonic material with enhanced chemical stability due to the silica physical barrier between the metal and its environment. After the desired nanoparticles are synthesized, coating with $SiO_2$ shells results by injecting small quantities of tetracthoxysilane (TEOS) to form silica on the nanoparticles source. By adjusting the amount of TEOS and the number of its additions to the growth solution, the thickness of the $SiO_2$ shell can be tuned from about 5 to 25 nm. These conformal coatings preserve the optical response of the metal nanoparticle colloid, as illustrated for various morphologies of Au and Au-silica core-shell nanoparticles in FIGS. 6A, 6B and 6C. In addition to $SiO_2$, the glass or ceramic shell can be another metal oxide, including, but not limited to $TiO_2$, $Al_2O_3$, SnO, $Al_2O_3$, $B_2O_3$, $ZrO_2$, $SnO_2$, any combination thereof, or any other metal oxide.

In the first method, the properly functionalized nanoparticles may be mixed with the PMMA monomers. The organic-inorganic composite material will then be spread out on a glass plate followed by the pressing of the second plate on top. For commercial production, it is conceivable to injection mold the PMMA/metal nanoparticle composite material into thin sheets, which are then laminated between two glass plates to produce the desired waveguide. This mixing method can easily adjust the loading of the nanoparticles, and with variable PMMA layer thickness, the amount of nanoparticles within the waveguide and therefore the optical transmittance can be readily tuned. However, it may be difficult to control the orientation of the anisotropic particles, which could prove critical for achieving high solar conversion efficiencies in the photovoltaic windows.

To control orientation of the anisotropic nanoparticle, such as nanoprisms and nanoplates, direct deposition onto one glass plate using solution processes such as spin coating or spray coating can be carried out. If desired or required, glass surface may need to be pretreated in oxygen plasma to improve wetting of the nanoparticle containing solution on the surface. For Example, Norland Optical Adhesive (NOA) precursors can be spread on a second glass plate, which is then pressed against the nanoparticle-coated surface of the first glass plate. The waveguide is completed by curing the NOA under UV irradiation. Multiple coatings of the nanoparticles can be formed, for example, by depositing a layer of nanoparticles on the first glass plate, spraying dissolved NOA, for example in toluene, onto the nanoparticles and rapidly drying and UV-polymerizing the NOA. Subsequently, repeated depositions of additional nanoparticles and polymerized NOA layers allow a host of non-aggregable metal nanoparticles. The number of coating cycles and the concentration and solution deposition conditions can be varied to control the amount of the plasmonic nanoparticles within the waveguide. Photovoltaic windows are constructed by attaching commercially available solar cells to the edges of the waveguide using optical adhesives.

It should be understood that the embodiments described herein are for illustrative purposes only and that various modifications or changes in light thereof will be suggested to persons skilled in the art and are to be included within the spirit and purview of this application.

We claim:

1. A window, comprising:

a first glass sheet and a second glass sheet, wherein window is configured where visible light travels through a front side of the window, through the first glass sheet and the second glass sheet and out of a backside of the window, and a combined nanoparticle polymer layer sandwiched between and in contact with the first and second glass sheets to produce a waveguide, the combined nanoparticle polymer layer comprising a transparent polymer layer having a multiplicity of metal nanoparticles dispersed on or within the transparent polymer layer, wherein the multiplicity of metal nanoparticles scatter light energy in at least visible and near-infrared regions of an electromagnetic spectrum, wherein the multiplicity of metal nanoparticles scatter the light energy at the surface plasmon resonance frequency where excitation of the multiplicity of metal nanoparticles surface plasmon oscillation occurs, wherein the metal nanoparticles decorate at least one surface of the combined nanoparticle polymer layer on a plane parallel to large area faces of the window, and a frame comprising at least one photovoltaic cell configured to harvest laterally scattered light energy from the near-infrared and/or the near-ultraviolet regions of the electromagnetic spectrum, the at least one photovoltaic cell residing in the frame perpendicular to a light receiving face of the window and parallel the waveguide to receive the laterally scattered light energy, wherein the waveguide has an edge where the waveguide meets the frame, wherein the waveguide is configured to direct the light energy to at least one photovoltaic cell in the frame at the edge of the waveguide.

2. The window according to claim 1, wherein the orientation of the metal nanoparticles is controlled by direct deposition onto at least one of the first glass sheet or the second glass sheet.

3. The window according to claim 2, wherein the metal nanoparticles are deposited by spin coating or spray coating.

4. The window according to claim 1, wherein the combined nanoparticle polymer layer is on the first glass sheet and a polymer or polymer precursor is disposed on to at least one of the first glass sheet or the second glass sheet.

5. The window according to claim 1, wherein the multiplicity of metal nanoparticles are of a plurality of sizes and shapes, wherein a majority of the metal nanoparticles are isolated from each other.

6. The window according to claim 1, wherein a fraction of the metal nanoparticles in contact is 0.1 or less.

7. The window according to claim 1, wherein each metal nanoparticle of the multiplicity of metal nanoparticles has a cross-sectional width of 10 to 200 nm.

8. The window according to claim 1, wherein the metal nanoparticles comprise a metal selected from: ruthenium, rhodium, palladium, osmium, iridium, platinum, rhenium, gold, silver, and copper, and alloys thereof.

9. The window according to claim 1, wherein the metal nanoparticles comprise a core-shell structure, and wherein the core comprises the metal and the shell is a glass or ceramic.

10. The photovoltaic system according to claim 9, wherein the glass or ceramic comprises, $SiO_2$, $TiO_2$, $Al_2O_3$, $SnO_2$, $ZrO_2$ or any combination thereof.

11. The window according to claim 1, wherein the combined nanoparticle polymer layer consists of the transparent polymer and the multiplicity of metal nanoparticles, wherein the transparent polymer comprises a polymeric resin or a thermoplastic.

12. The window according to claim 11, wherein the polymeric resin or thermoplastic comprises an acrylic, a polycarbonate, or a polyurethane.

13. The window according to claim 1, wherein the photovoltaic cell comprises polycrystalline silicon, monocrystalline silicon, or copper indium gallium selenide.

14. The window according to claim 1, wherein the multiplicity of metal nanoparticles are spheres, rods, prisms, disks, rice-shaped, shelled, donut-shaped, or any combination thereof.

15. The window according to claim 1, wherein the multiplicity of metal nanoparticles imparts a tint, a color-neutrality, or a variable light transmittance in the visible spectrum over portions of the window.

16. The window according to claim 1, wherein in addition to the portion of the near-infrared spectrum, the light energy includes at least one of a portion of the near ultraviolet spectrum and a portion of the visible spectrum that enters the combined nanoparticle polymer sheet is directed through the waveguide to an edge of the waveguide to be received by the at least one photovoltaic cell.

17. The window according to claim 1, wherein the metal nanoparticles are configured to laterally scatter selected regions of the electromagnetic spectrum to the frame, and the metal nanoparticles are of sizes and shapes that have a peak surface plasmon resonance frequency in near-infrared to near-ultraviolet regions of an electromagnetic spectrum.

* * * * *